United States Patent

Stark et al.

[11] Patent Number: 5,924,531
[45] Date of Patent: Jul. 20, 1999

[54] VIBRATION DAMPING SHAFT LINER

[75] Inventors: Martin H. Stark, 5552 Colony Dr. North, Saginaw, Mich. 48603; David A. Galonska, Saginaw, Mich.

[73] Assignee: Martin H. Stark, Saginaw, Mich.

[21] Appl. No.: 08/721,550

[22] Filed: Sep. 26, 1996

[51] Int. Cl.⁶ .................................................. F16C 1/00
[52] U.S. Cl. ............................................ 188/372; 464/180
[58] Field of Search .......................... 188/372; 464/179, 464/180

[56] References Cited

U.S. PATENT DOCUMENTS

| | | | |
|---|---|---|---|
| 2,751,765 | 11/1956 | Rowland et al. | 464/180 |
| 3,814,549 | 6/1974 | Cronstedt | 417/406 |
| 4,014,184 | 3/1977 | Stark | 464/180 |
| 4,124,928 | 11/1978 | Stark | 464/180 |
| 4,909,361 | 3/1990 | Stark et al. | 464/180 |

*Primary Examiner*—Matthew C. Graham
*Attorney, Agent, or Firm*—Reising, Ethington, Barnes, Kisselle, Learman & McCulloch, P.C.

[57] ABSTRACT

A vibration damping liner for insertion in the bore of a cylindrical shaft has a cylindrical core the exterior of which is corrugated and defined by alternating grooves and upstanding flutes. The liner has an undeformed flute diameter greater than that of the bore. All of the flutes are deformed prior to insertion of the liner into the cylindrical shaft laterally of their length and in the same direction to produce a liner having a deformed flute diameter less than the undeformed flute diameter, but still greater than the diameter of the bore. As the liner is inserted in the bore, the deformed flutes may deform further radially inwardly, but once the liner is in the shaft the flutes expand into engagement with the surface of the bore. The flutes have thereon a coating of material having a coefficient of friction greater than that of the flute-forming material.

14 Claims, 1 Drawing Sheet

VIBRATION DAMPING SHAFT LINER

This invention relates to a liner especially adapted for use in an automotive drive shaft for damping vibrations and attenuating noise.

BACKGROUND OF THE INVENTION

It has been the practice for many years to insert a cylindrical liner into a cylindrical automotive drive shaft for the purpose of damping vibrations and attenuating, at least to some extent, noise transmitted along the shaft. Examples of such liners are disclosed in U.S. Pat. Nos. 2,751,765; 4,014,184; 4,124,928; and 4,909,361.

Although the known liners have the capability of functioning satisfactorily, several factors may have an adverse effect on their efficiency. For example, the liners obviously must be manufactured prior to assembly with the drive shafts and often must be shipped from the point of manufacture to the point of assembly with the drive shafts. During the time between manufacture and assembly, the liners may be exposed to wide variations in humidity. If the liners are formed of paper, as is customary, and if the paper from which the liners are formed is hygroscopic, as conventionally is the case, humidity changes can and do affect some of the properties of the liners.

If a liner is formed of a cylindrical paper core having an exterior layer of corrugated material, such corrugated layer having alternating grooves and upstanding flutes, changes in humidity may cause considerable variations in the resistance to deformation of the flutes, as well as the spring rate or recovery characteristic of the flutes from such deformation. As a consequence, the force required to insert a liner into a drive shaft may vary considerably due to changes in humidity.

It is conventional to close the ends of a drive shaft following insertion of a liner into the shaft, thereby minimizing the effect of subsequent changes in humidity. Following insertion of the liner and closing the ends of the shaft, the shaft containing the liner is balanced. However, if the liner has shrunk radially due to a relatively low humidity at the time of insertion of the liner in its shaft, the position of the liner in the shaft may change in response to torsional forces to which the shaft is subjected following its inclusion in a vehicle. Relative movement between the liner and the shaft is objectionable because the shaft then may become unbalanced, thereby defeating the purposes for which the liner is incorporated in the shaft.

A liner constructed in accordance with the invention overcomes the disadvantages referred to above.

SUMMARY OF THE INVENTION

A vibration damping liner for a cylindrical drive shaft or other member comprises a cylindrical core on the exterior of which is wound a corrugated layer having alternating helical grooves and flutes. The diameter of the liner at the flutes is greater than the inside diameter of the shaft, thereby necessitating deformation of the flutes to insert the liner in the shaft. The flutes are subjected to a deforming treatment prior to the application of the corrugated layer to the core which deforms each flute in a direction transversely of its length. The deforming treatment reduces the flute diameter of the liner to one that is less than the undeformed flute diameter of the liner, but still is greater than the diameter of the bore. The material from which the flutes are formed is resilient so that each flute is flexible and bears yieldably against the surface of the bore. Preferably, the opposite ends of each flute are collapsed to a height less than that of the remainder of such flute.

Some or all of the flutes may be coated with frictional material which has a coefficient of friction considerably greater than that of the material from which the flutes are formed, but such frictional material does not prevent radial flexing of the flutes.

Following lateral deformation of the flutes and collapsing of their ends, the corrugated material is wound on and secured to the core. The coating of frictional material may be applied to the corrugated material either before, during, or following winding of the corrugated material on the core.

The flutes are deformed in one direction only, thereby facilitating temporary radial contraction of the liner by a sizing ring as the liner is inserted in a shaft. As the liner passes through the sizing ring into the shaft the flutes expand radially into engagement with the surface of the bore. The resilience of the material from which the flutes are formed causes them to expand radially even more, thereby causing the flutes to bear forcibly on the surface of the bore. The tendency of the flutes to expand radially causes the frictional coating also to bear on the surface of the bore, thereby providing considerable resistance to relative movement of the liner and shaft following insertion of the liner into the shaft.

THE DRAWINGS

A vibration damping liner constructed in accordance with preferred embodiments of the invention are disclosed in the accompanying drawings, wherein:

FIG. 8 is a flow diagram illustrating the procedural steps of forming the liners of FIGS. 1 and 7.

DETAILED DESCRIPTION

Figure 1:
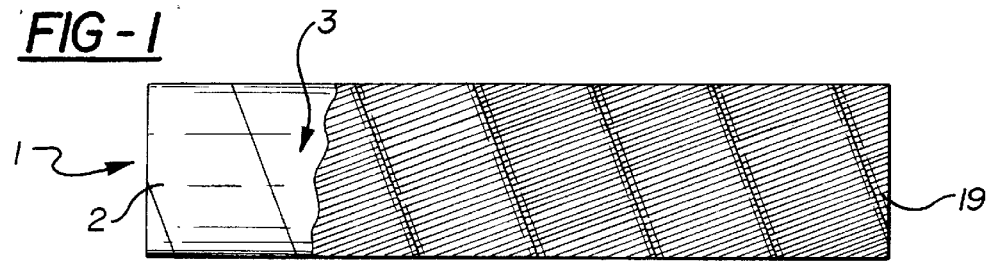
FIG. 1 is an elevational view, with parts broken away, of one embodiment of the invention.
Figure 2:
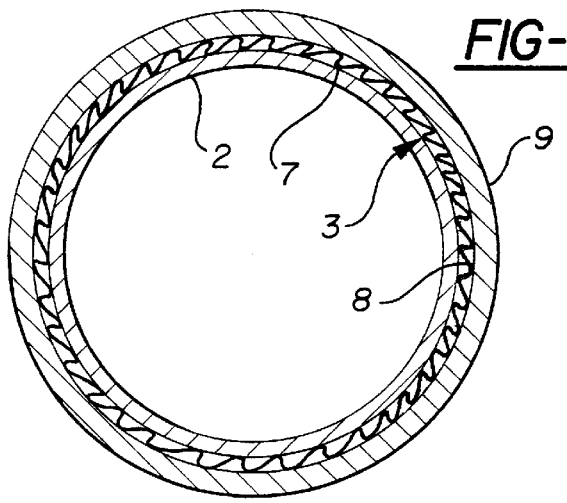
FIG. 2 is a transverse sectional view of the damping liner within a cylindrical shaft.
Figure 3:
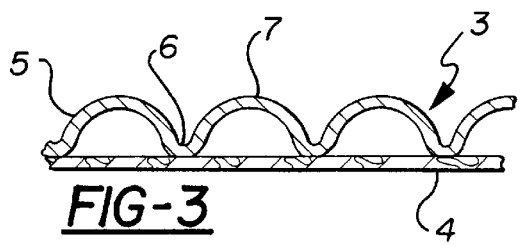
FIG. 3 is a sectional view through a conventional single faced layer of corrugated paper.

A vibration damping liner constructed in accordance with one embodiment of the invention is designated generally by the reference character 1 in FIG. 1 and comprises a cylindrical core 2 formed of kraft or other suitable paperboard as is conventional. On the outer surface of the core is wound and secured a continuous strip 3 of single faced, corrugated paper formed in the conventional manner from kraft or other suitable paperboard which has some resilience. As shown in FIG. 3, the corrugated strip 3 has a base 4 to which is secured an overlying strip 5 of paper having alternating grooves 6 secured to the base and upstanding, curvilinear flutes 7.

The liner is adapted to be inserted into the bore 8 of a cylindrical drive shaft or other hollow member 9 having a smooth surface. The diameter of the core 2 is less than that of the bore 8, but the maximum diameter of the liner 1 through the upstanding, undeformed flutes 7 (hereinafter referred to as the undeformed flute diameter) is greater than that of the bore 8.

Figure 4:
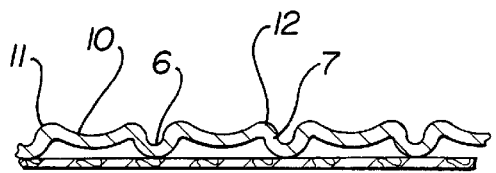
FIG. 4 is a view similar to FIG. 3 illustrating the flutes of the corrugations collapsed in the conventional manner.

Insertion of the liner 1 into the shaft 9 may be effected by apparatus such as that disclosed in U.S. Pat. No. 4,124,928 which includes a sizing ring that deforms the flutes of the corrugated strip 3. Deformation of the flutes 7 according to the prior art produces radially outward concave surfaces 10 terminating at their opposite ends in convex ribs 11 and 12, as shown in FIG. 4. As a consequence, when a liner having flutes deformed as is shown in FIG. 4 is inserted in the bore of a shaft, only the ribs 11 and 12 will engage the inner surface of the bore; and such ribs have little, if any, springiness.

A liner 1 formed in accordance with the invention commences with the formation of the core 2 on which subsequently is wound a corrugated layer 13 composed of the corrugated strip 3 modified as described below. The core is conventional and comprises a plurality of plies of paperboard or other suitable material. However, prior to winding the corrugated strip 3 on the core 2, the strip 3 is placed on a support 14 and passed beneath a rotary deforming roller 15 in the direction of the arrow A in FIG. 5. The roller 15 rotates in the direction of the arrow B and comprises a spindle 16 and a cylindrical section 17 terminating at each end in an enlarged cylindrical rim 18.

Figure 5:
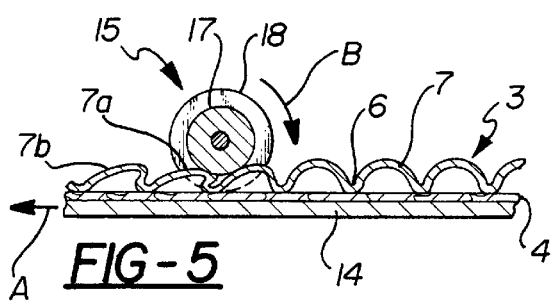
FIG. 5 is a sectional view showing deformation of the corrugated flutes according to the invention.

As is best shown in FIG. 5, the height of the periphery of the cylindrical section 17 from the upper surface of the support 14 is less than the height of the undeformed flutes 7 so that movement of the corrugated strip 3 beneath the roller 15 causes the flutes 7 to be deformed longitudinally of each flute, as is shown in FIG. 5. As each flute passes beneath the roller 15, the central section 17 thereof causes such flute to be deformed to a height above the support 14 that is substantially lower than that of the height of the undeformed flute. For example, if the height of the undeformed flute is 0.180 inch, each flute passing beneath the central section 17 of the roller 15 temporarily may be deformed to a height of 0.100 inch. This deformation is indicated at 7a in FIG. 5.

Since the material from which the flutes are formed is resilient, disengagement of each flute from the central section of the roller enables the deformed flute to spring back to a height that is between its maximum deformation and its original undeformed height. This characteristic is shown by the flute 7b in FIG. 5. The spring back or permanent deformation height of the deformed flute 7b may be 0.150 inch.

Figure 6:
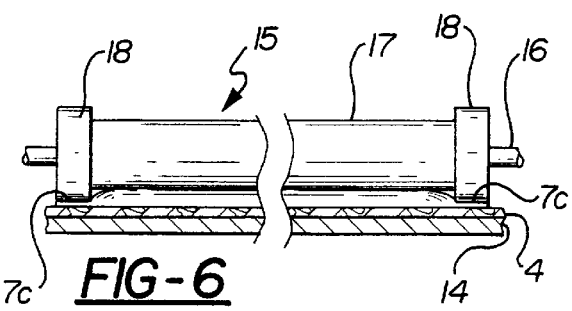
FIG. 6 is a fragmentary sectional view illustrating the apparatus shown in FIG. 5.

If a corrugated strip such as the strip 3 is spirally wound on the core 2, as is shown in FIG. 1, that portion of the corrugated layer at each end of the liner forms what is known as a tail. Such a tail is indicated at 19 in FIG. 1. Tails have a tendency to separate from the core because of the small area of the tail and the consequently small adhesive bond available. Separation of the tails may be overcome or greatly minimized by collapsing the opposite ends of each of the flutes 7 as shown at 7c in FIG. 6. The collapsing of the flutes results in a liner diameter that is minimum at the ends of the flutes and the collapsing is achieved by the rims 18 of the roller 15 at the same time that the other parts of the flutes are deformed. The collapsing or flattening of the ends 7c of the flutes virtually destroys all of the resiliency of the material from which the flutes are formed, thereby preventing the spring-back tendencies of an unflattened or partially flattened flute to cause the tail 19 to separate from the core.

The corrugated layer 13 comprises the strip 3 having the deformed flutes 7b and the collapsed flute ends 7c.

As has been indicated above, the process of constructing the liner comprises forming the core 2, deforming all of the flutes 7 laterally of their length and in the same direction and, at the same time, flattening the ends 7c of the flutes, following which the corrugated layer 13 is wound on and secured to the outer surface of the core 2.

In the condition of the liner 1 prior to its assembly with the shaft 9, the diameter of the liner through diametrically opposite deformed flutes 7b (hereinafter the deformed flute diameter) is greater than the diameter of the bore 8 of the shaft 9. Accordingly, the liner should be introduced to the bore via a sizing ring which will compress the flutes 7b radially inwardly so as temporarily to reduce the deformed flute diameter of the liner to one that is less than or corresponds substantially to the diameter of the bore 8. As the liner passes into the bore of the shaft, the resilience of the material from which the flutes are formed enables the flutes compressed by the sizing ring to spring back or expand radially outwardly and bear forcibly against the inner surface of the bore.

From a comparison of the flutes 7b shown in FIG. 5 with the flutes shown in FIG. 4, it is clear that each flute 7b has a much greater surface area available for engagement with the inner surface of the bore of the shaft 9. Consequently, the greater surface contact, coupled with the constant biasing of the flutes 7b toward the inner surface of the bore, enables the liner 1 to resist significantly any movement relative to the shaft 9. However, because of the substantially uniform deformation of all flutes in the same direction, the insertion of the liner in the shaft 9 requires considerably less force than is required to insert a conventional liner in a corresponding shaft.

Figure 7:
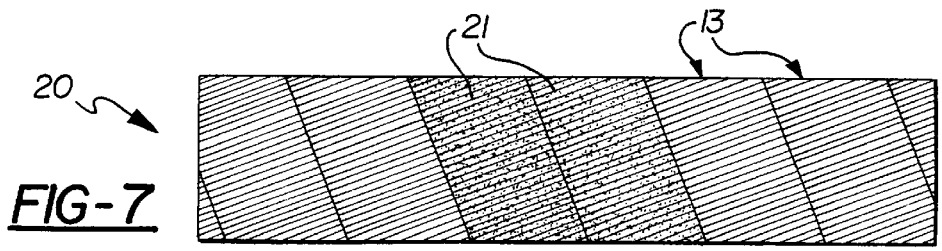
FIG. 7 is a view similar to FIG. 1, but illustrating a further embodiment.

In the embodiment shown in FIG. 7, the liner 20 corresponds to and is formed in the same way as that described earlier, but differs from the latter by the inclusion of a coating 21 of frictional material on some or all of the convolutions of the corrugated layer 13. The coating should be applied at least to the central part of the liner, i.e., axially inward of its ends, but such coating may be applied to the entire length of the liner.

The frictional material should be one that has a considerably higher coefficient of friction than the material from which the corrugated layer 3 is formed and, of course, higher than that of the inner surface of the bore 8. The frictional material also should be one which does not inhibit radial flexure or deformation of the flutes 7. One suitable frictional material is commercially available, high friction polyurethane. Another is formulated rubber latex such as that manufactured by National Starch and Chemical Company, Bridgewater, N.J., and described in its Specification 35-6198 relating to Resyn Self Seal. The coating of the flutes with the frictional material enhances the resistance to relative movement between the liner 1 and the shaft 9.

Although liners constructed in accordance with the invention may suffer the same exposure to varying humidity conditions as liners produced heretofore, the springiness of the deformed flutes and the relatively large surface area thereof that is engageable with the inner surface of the bore 8 enables liners constructed in accordance with the invention to exhibit satisfactory resistance to movement relative to the shaft.

FIG. 8 illustrates the operative steps of forming the liner which comprise forming the core, deforming the corrugation flutes, applying the corrugated layer to the core and, when desired, applying the frictional coating to some or all of the flutes. It is possible to vary the order of the manipulative steps. For example, the frictional coating could be applied prior to deformation of the flutes or it could be applied prior to the application of the corrugated layer to the core.

The disclosed embodiments are representative of presently preferred forms of the invention, but are intended to be illustrative rather than definitive thereof. The invention is defined in the claims.

What is claimed is:

1. A liner for insertion in a hollow, cylindrical member having a bore of selected diameter, said liner comprising a tube having fixed on its exterior corrugations defined by alternating grooves and upstanding flutes, each of said flutes having an undeformed radial height such that the undeformed flute diameter of said liner is greater than the diameter of said bore, at least a major portion of each of said flutes being permanently deformed prior to insertion of said liner in said member and in a direction laterally of its length to reduce the height of said flute so that the diameter of said liner diametrally of said deformed flutes is less than the undeformed flute diameter of said liner but still is greater than the diameter of said bore, the lateral deformation of said flutes enabling such flutes to be compressed radially upon insertion of said liner in the bore of said cylindrical member, the material from which said flutes are formed having sufficient resilience to enable such flutes to expand radially into engagement with the surface of said bore when said liner is within said cylindrical member.

2. The liner according to claim 1 wherein all of said flutes extend helically of said tube and in the same direction.

3. The liner according to claim 1 wherein all of said flutes are laterally deformed in the same direction.

4. The liner according to claim 1 wherein at least some of said flutes are coated with a material having a coefficient of friction greater than that of the material from which said flutes are formed.

5. The liner according to claim 1 wherein each of said flutes has opposite ends, each of said flutes being collapsed adjacent each of its ends.

6. The liner according to claim 1 wherein said tube comprises a plurality of plies of wound paperboard.

7. The liner according to claim 1 wherein said flutes and grooves are formed by single faced corrugated paper spirally wound on said tube.

8. A liner for insertion in a hollow, cylindrical member having a bore of selected diameter, said liner comprising a cylindrical core having a corrugated exterior surface defined by alternating grooves and radially upstanding flutes, said liner having a diameter at said grooves less than that of said bore and an undeformed flute diameter greater than that of said bore, each of said flutes being permanently deformed prior to insertion of said liner in said member and radially inwardly and laterally of its length to produce a deformed flute diameter of said liner less than that of said undeformed flute diameter but still greater than that of said bore, the lateral deformation of each of said flutes facilitating radially inward compression of said flutes in response to insertion of said liner into the bore of said cylindrical member, the material from which said flutes are formed having sufficient resilience to enable said flutes to expand radially into engagement with the surface of said bore when said liner is within said cylindrical member.

9. The liner according to claim 8 wherein the alternating grooves and flutes defining said corrugated surface extend helically about said core.

10. The liner according to claim 8 wherein said core is formed of paperboard and said corrugated surface is formed by single faced corrugated paper wound on and secured to said core.

11. The liner according to claim 8 wherein each of said flutes is permanently deformed radially inwardly at its opposite ends to an extent greater than elsewhere along its length, thereby producing a deformed flute diameter at each end of each flute which is minimum.

12. The liner according to claim 8 including a coating of frictional material on the exterior of at least some of said flutes, said frictional material having a coefficient of friction greater than that of the material from which said flutes are formed.

13. The liner according to claim 12 wherein said coating occupies a position axially inward from and terminates short of opposite ends of said liner.

14. A liner for insertion in a hollow, cylindrical member having a bore of selected diameter, said liner comprising a tube having fixed on its exterior corrugations defined by alternating grooves and upstanding flutes, each of said flutes having an undeformed height such that said liner has an undeformed flute diameter greater than the diameter of said bore, at least a major portion of each of said flutes being permanently deformed prior to insertion of said liner in said member to reduce the height of said flute so that the diameter of said liner diametrally of said deformed flutes is less that the undeformed flute diameter of said liner but still is greater than the diameter of said bore, the deformation of said flutes facilitating radial compression thereof in response to insertion of said liner in said cylindrical member, the material from which said flutes are formed having sufficient resilience to enable such flutes to expand radially into engagement with the surface of said bore when said liner is within said cylindrical member, and a coating of frictional material on at least some of said flutes, said frictional material having a coefficient of friction greater than that of the material from which said flutes are formed.

* * * * *